UNITED STATES PATENT OFFICE.

JULIUS SCHWEITZER, OF NEW YORK, N. Y.

EXTRACT OF MEAT.

SPECIFICATION forming part of Letters Patent No. 326,793, dated September 22, 1885.

Application filed May 14, 1885. (No specimens.)

*To all whom it may concern:*

Be it known that I, JULIUS SCHWEITZER, of the city, county, and State of New York, have invented certain new and useful Improvements in Extracts of Meat, of which the following is a specification.

This invention has reference to an improved albuminous extract of meat, which has a better taste and is more nutrient than the peptonized extracts of meat heretofore obtained from meat alone.

The invention consists of a mixture of extract of meat with digested egg-albumen.

In preparing my albuminous extract of meat egg-albumen is treated with acidulated gastric juice or pepsin until it is properly digested. From three to five parts of egg-albumen treated in this manner and evaporated to concentration are then mixed in a water bath, at a temperature below the boiling-point, with one part of ordinary extract of meat, whereby an albuminous extract of meat is obtained, which possesses all the nourishing and stimulating qualities of meat.

In preparing the digested egg-albumen both constituents of eggs—the white and the yolk— can be used, in the raw or soft-boiled state, or even hard-boiled state. Even in the latter condition it is more easily dissolved by gastric juice or pepsin than meat fiber. By thus adding to the ordinary extract of meat digested egg-albumen the albuminous constituents which are originally contained in meat, and which are destroyed in the boiling process and rejected, are reintroduced, so that an extract of meat is obtained that has all the properties of the meat—namely, the albuminous, nutrient, and extractive stimulating properties.

Having thus described my invention, I claim as new and desire to secure by Letters Patent—

A meat-extract consisting of ordinary extract of meat and digested egg-albumen, substantially as set forth.

In testimony that I claim the foregoing as my invention I have signed my name in presence of two subscribing witnesses.

JULIUS SCHWEITZER.

Witnesses:
PAUL GOEPEL,
SIDNEY MANN.